United States Patent
Reichelt et al.

Patent Number: 6,113,299
Date of Patent: Sep. 5, 2000

[54] VARIABLE-POSITION FRONTAL CLAMPING SYSTEM FOR AN ANNULAR COMPONENT

[75] Inventors: Helmut Reichelt, Denkendorf; Maximilian Jeglitzka, Stuttgart, both of Germany

[73] Assignee: DaimlerChrysler AG, Stuttgart, Germany

[21] Appl. No.: 09/011,536

[22] PCT Filed: Jul. 17, 1996

[86] PCT No.: PCT/EP96/03139

§ 371 Date: Jun. 16, 1999

§ 102(e) Date: Jun. 16, 1999

[87] PCT Pub. No.: WO97/06047

PCT Pub. Date: Feb. 20, 1997

[30] Foreign Application Priority Data

Aug. 4, 1995 [DE] Germany ............................ 195 28 790

[51] Int. Cl.$^7$ ........................................................ F16B 5/00
[52] U.S. Cl. ........................ 403/13; 403/168; 280/86.75; 280/93.511
[58] Field of Search ................................ 403/13, 14, 104, 403/106, 83, 150, 151, 157, 161, 167–168; 280/93.502, 86.75, 86.751, 86.752, 93.51, 93.511; 411/418, 420, 539

[56] References Cited

U.S. PATENT DOCUMENTS

| | | | |
|---|---|---|---|
| 1,157,072 | 10/1915 | Wilcox | 403/157 |
| 4,243,339 | 1/1981 | Dickerson | 403/157 X |
| 4,595,216 | 6/1986 | Ware | 280/86.75 |
| 4,838,573 | 6/1989 | Specktor et al. | 280/86.75 |
| 5,443,281 | 8/1995 | Burkard et al. | 280/93.502 |
| 5,647,606 | 7/1997 | Jordan | 280/86.751 |

FOREIGN PATENT DOCUMENTS

| | | | |
|---|---|---|---|
| 2004966 | 12/1969 | France | 403/161 |
| 4206415C1 | 3/1993 | Germany . | |
| 4327021C1 | 2/1995 | Germany . | |
| 2006695 | 1/1994 | Russian Federation | 403/161 |
| 531936 | 10/1976 | U.S.S.R. | 411/418 |
| 1372119 | 2/1988 | U.S.S.R. | 403/157 |
| 2039657 | 8/1980 | United Kingdom | 411/539 |

*Primary Examiner*—Harry C. Kim
*Attorney, Agent, or Firm*—Evenson, McKeown, Edwards & Lenahan, P.L.L.C.

[57] ABSTRACT

A position-variable face-side clamping of a ring body between bearing legs with a screw bolt is to permit a central mounting of the screw bolt at reasonable cost. It must be possible to use especially profiled screw bolts for eccentric positions. For this purpose, the ring body and/or the bearing legs are provided with one oblong hole respectively which, on its longitudinal sides, has, in each case, at least two axially aligned, mutually opposite guide webs. In the case of oblong holes with only two guide webs on each longitudinal side, a centric mounting is possible by using a bolt with a cylindrical circumferential surface which can be received between the two guide webs. Eccentric offsets are permitted by the use of special formed bolts which have guide grooves assigned to the guide webs.

16 Claims, 2 Drawing Sheets

VARIABLE-POSITION FRONTAL CLAMPING SYSTEM FOR AN ANNULAR COMPONENT

BACKGROUND AND SUMMARY OF THE INVENTION

This application claims the priority of PCT application EP96/03139 filed in Europe on Jul. 17, 1996 and German application 195 28 790.8 filed in Germany on Aug. 4, 1995, the disclosure of which is expressly incorporated by reference herein.

The invention relates to a position-variable face-side clamping of a ring body, particularly in the case of a bearing for wheel control arms of motor vehicles. The ring body is clamped in use between oppositely situated bearing legs by means of a bolt which can be axially inserted into aligned openings in the bearing legs as well as the ring body and having stops which can be provided on the end sides of the bolt for bracing the legs with respect to the ring body.

Position-variable linkings of the above-mentioned type are customary, for example, when wheel control arms for motor vehicles are linked in order to be able to fix eccentric positions deviating to both sides starting from a center position endeavored in series-type assembling. In addition to having other reasons, this is endeavored in order to be able to correct changes of the camber and caster, which occurr after slight collisions, such as a violent contact with the curb, to such an extent that the tolerance field for the caster and the camber permitted within the framework of the series production and for a safe operating behavior is maintained again. Otherwise, such corrections would require interventions in the vehicle body, for example, by realigning it, which is required after more serious accidents but would lead to unacceptable expenditures in the case of less serious collisions.

In the case of a construction known from German Patent Document DE 4327021 C1, the adjusting possibilities are, among other things, achieved by an especially profiled shape of the openings of the bearing legs together with washers which are profiled in an adapted manner and by using screw bolts with machined-in profiled recesses. An especially profiled screw bolt is required only for a position offset from the center. In contrast, for a centric position of the screw bolt, a conventional screw bolt can be used, for example, in a standardized construction, which has a cylindrical shaft and a thread which is not interrupted with respect to its circumference. This profiling of the openings in the bearing legs consists of the fact that, in the case of a basic oblong hole shape, one guide web respectively which projects into the opening is provided on the opposite short sides so that each of the bearing leg openings has a pair of oppositely situated guide webs. As a result of these guide webs, a screw bolt which is closed with respect to its circumference can be introduced in a centric manner. However, if a screw bolt is to be situated eccentrically in the opening of a bearing leg, a screw bolt must be used which is especially provided with a guide groove. In that the screw bolt reaches by means of this one guide groove over the guide web of the oblong hole bore of the bearing leg, it is situated eccentrically inside this opening. In order to be held in this position during the assembly, a ring disk must be used which can be inserted into the opening of the bearing leg such that the screw bolt cannot slide out of its eccentric position. The ring disk must therefore be provided with a cam which reaches into the opening.

From German Patent Document DE 42 06 415 C1, a clamping of the above-mentioned type is also known in the case of which the screw bolt is at least partially toothed on its circumference and, in the bearing legs, can be slid in one oblong hole respectively, with an identically toothed edge transversely to the axis of the ring body. In the case of this construction, particularly no desired position of the screw bolt can be predetermined within the bearing leg openings. On the contrary, this desired position must in each case be adjusted because the screw bolt may take up positions which basically deviate from a center position within the oblong hole. In practice, this is sometimes undesirable.

In view of the above, the invention is mainly based on the problem of further developing the position-variable clamping of the above-mentioned type such that the position fixing of the bolt can be achieved without additional auxiliary devices. Thus, on the one hand, in the case of an eccentric installation of the bolt, no additional washer is to be required. In addition, particularly a position-variable clamping in circular openings of the bearing legs is to be possible. Furthermore, in the case of a centric mounting of the bolts, no screw bolts are to be required which have non-standardized special shapes.

A solution to the above-mentioned problems is indicated by a position-variable clamping of the above-mentioned type wherein the openings in the ring body and/or the bearing legs are oblong holes on whose longitudinal sides at least two axially extending, mutually opposite guide webs respectively are provided which permit a fixing of the bolt in different areas of the oblong hole.

In the case of the solution according to the invention, the displacement space required for a position-variable clamping can be transferred particularly advantageously with respect to the manufacture into the central opening of the ring body if this ring body is a deformable part.

In principle, the displacement space, which according to the invention is designed in the form of an oblong hole provided with guide webs, can simultaneously be provided in the ring body and in the bearing legs. As a result, the adjustable displacement path between the ring body and the bearing legs can be doubled in comparison to a construction in which only one of the two parts is provided with an oblong hole and the other part is provided with a circular receiving opening or openings.

In cases in which the bearing legs are a component of a casting which is difficult to manufacture with narrow tolerances, while the ring body can be produced relatively easily by means of a profiled interior mold, the displacement space is preferably provided only in the ring body, while the bearing legs are provided with circular openings which can be produced, for example, by drilling. Even by means of purely cylindrical bolts, that is, bolts which have a closed cylindrical outer surface, the invention permits basically several positions of the ring body and the bearing legs which are offset with respect to one another. For this purpose, only a correspondingly sufficient number of guide webs are required in the respective oblong hole openings. However, an embodiment of the oblong holes is preferable which has two guide webs respectively mounted on each longitudinal side of an oblong hole, in which case the oblong holes may basically be situated in the bearing legs and/or within the ring body. Furthermore, the guide webs must preferably be arranged at such a distance from the transverse sides of an oblong hole that a purely cylindrical bolt can be inserted only between the two guide webs. As a result, when a purely cylindrical bolt is used, only a mounting in the center position of an oblong hole is possible.

If an oblong hole exists only either in the bearing legs or in the ring body and is provided with only two guide webs per longitudinal side, while the respective other part has a circular opening or openings, the ring body and the bearing legs can be mounted only in a predefinable desired assignment position.

Assignments between the ring body and the bearing legs which deviate from a predeterminable desired assignment position can in every case be achieved according to the invention by means of especially shaped bolts. The special shape of such bolts consists of opposite longitudinal guide grooves with an assignment which is adapted to the guide webs in the oblong hole or holes such that the bolts can be slid in the manner of a tongue-and-groove connection onto the guide webs in the oblong hole or holes.

In the case of special embodiments with only two guide webs per longitudinal side of an oblong hole, the guide grooves in a formed bolt required for an offset installation should not be diametrically opposite one another. On the contrary, the guide grooves should be distributed such along the circumference that two curved sections are formed between them which differ with respect to the circumference. By means of the corresponding shaping of the oblong holes with the guide webs situated in them which receive such a formed bolt, it can therefore be recognized because of the circumferential position of the screw bolt to which side the bolt is displaced inside the oblong hole. This is of interest, for example, when the oblong hole is situated inside the ring body and, as a result, the inserting position cannot be easily recognized from the outside. The inserting position can particularly not be recognized when the bearing legs have a circular receiving opening.

In order to be able to easily recognize in the latter case an offset position of a bolt, the face side of the bolt can be provided on that circumferential side which comes to rest in each case against the narrow side of an oblong hole with an arrowhead having an arrow shaft extending to the center of the bolt.

If the central opening of the ring body is the oblong hole designed according to the invention for receiving a connection bolt, this oblong hole can be limited to an axial center area within the ring body. A ring body with a corresponding interior profiling can be easily implemented in the case of a part produced by original forming or deforming.

Other objects, advantages and novel features of the present invention will become apparent from the following detailed description of the invention when considered in conjunction with the accompanying drawings.

DETAILED DESCRIPTION OF THE DRAWINGS

Figure 1:
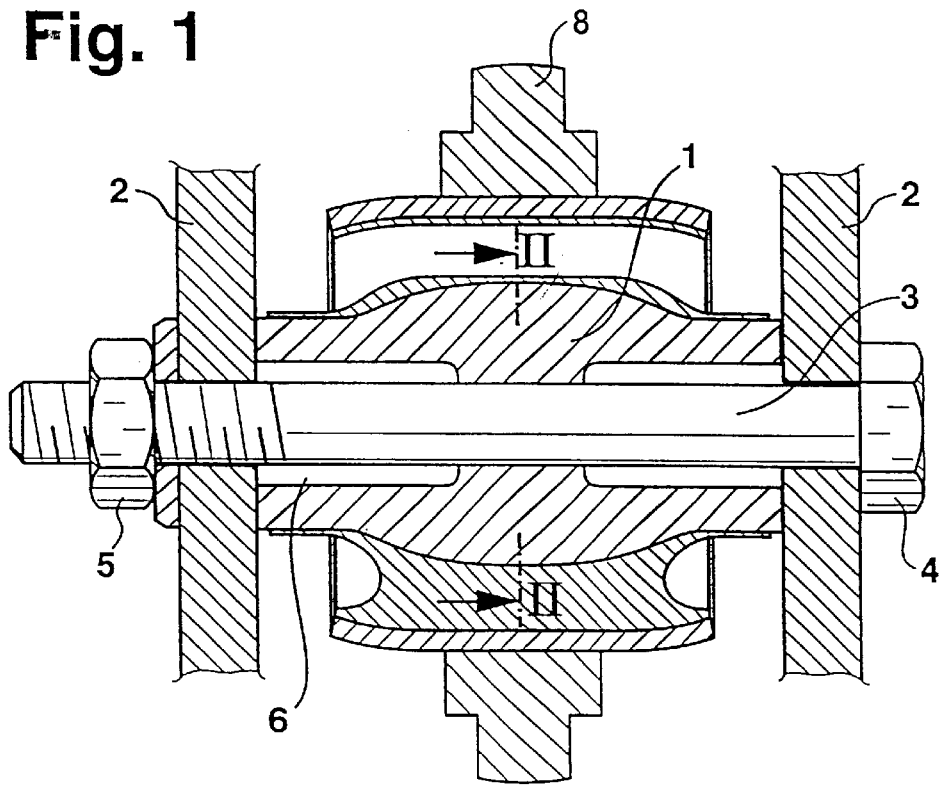
FIG. 1 is a longitudinal sectional view of a ring body clamped in between two bearing legs, constructed according to a preferred embodiment of the invention.
Figure 2A:
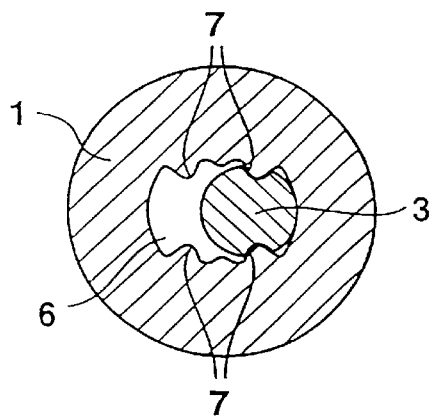
FIGS. 2a–c are sectional views respectively of the ring body with bolts situated in them according to Line II—II in FIG. 1 with respective offset positions of the bolt inside the oblong hole of the ring body serving as the receiving opening.
Figure 2C:
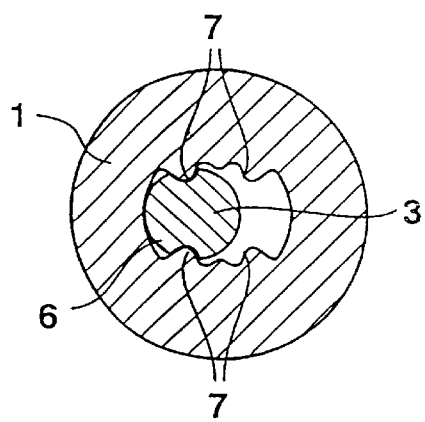
Figure 2B:
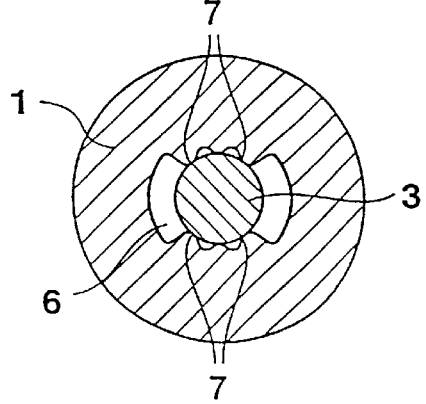

In FIG. 1, a ring body 1 is clamped on its end faces by means of a screw bolt 3 between two bearing legs 2. The screw bolt 3 reaches through the bearing legs 2 as well as the ring body 1, in which case it rests on one end by means of a screw head 4 against one bearing leg and on its other end by means of a nut 5 screwed on there on the other bearing leg 2. The openings of the bearing legs 2 are circular for receiving the screw bolt 3. The position variability between the bearing leg 2, on the one hand, and the ring body 1, on the other hand, is therefore permitted only by way of an oblong hole 6 in the center of the ring body 1. On each longitudinal side, this oblong hole 6 has two guide webs 7 respectively which are situated opposite one another on both longitudinal sides of the axial center area of the ring body 1.

The arrangement of the guide webs 7 is such that a screw bolt 3 in a simple cylindrical construction can be introduced only centrically between the guide webs 7 into the ring body 1.

If, the ring body, like 1, as illustrated in FIG. 1, is the eye of a wheel control arm 8 of a motor vehicle and if the receiving openings in the bearing legs 2 are circular in the case of an oblong hole 6 within the ring body with only two guide webs per longitudinal side, the screw bolt 3 can be introduced only in a single centric desired position if the space between the guide webs 7 and the transverse sides of the oblong hole 6 is designed to be so narrow that it is not possible to receive the bolt 3 there. Only one possible centric desired position of the screw bolt 3 is desired in practice when a wheel control arm 8 is mounted in a linked manner because only then will it be ensured that the individual mutually connected wheel control arm parts are in the predetermined manufacturing tolerance field so that the caster and the camber can also automatically be achieved within a predetermined tolerance field.

However, when using a purely cylindrical bolt, an exclusively centric mounting is also possible if the oblong holes in the ring body 1 as well as in the bearing legs 2 are provided on each longitudinal side with only two guide webs 7 and these are spaced so closely away from the narrow sides of the oblong hole that a bolt bearing is possible only between the two guide webs 7.

Figure 3:
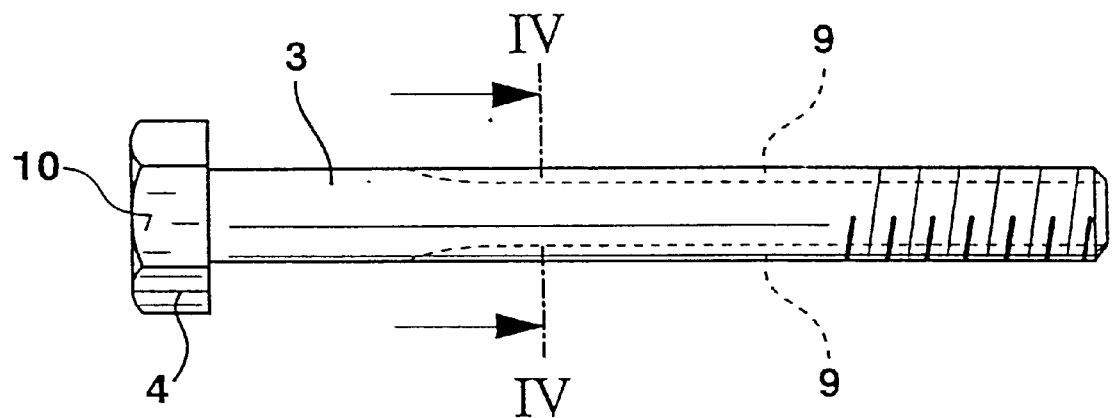
FIG. 3 is a view of a formed bolt constructed as a screw bolt with guide grooves.
Figure 4:
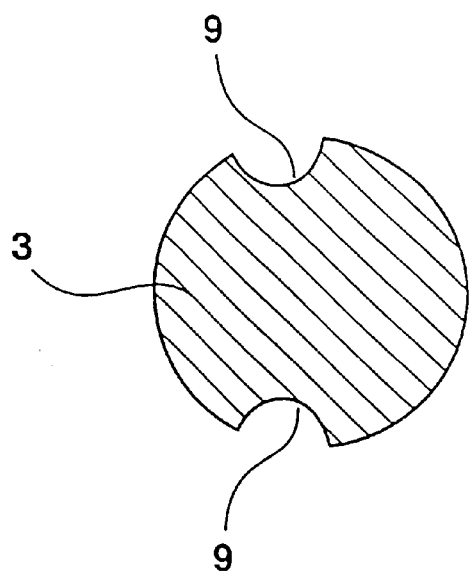
FIG. 4 is a sectional view of the formed bolt according to Line IV—IV in FIG. 3.

For an eccentric position within an oblong hole 6, one formed bolt 3 respectively is required in the special construction according to FIG. 3 with guide grooves 9 extending along its axis. This means that, in repair cases, a purely cylindrical screw bolt 3 centrically inserted in the series-type assembly must be replaced by an especially formed screw bolt 3 with guide grooves 9 if it is to be used eccentrically.

In the case of the screw bolts 3, the guide grooves are not situated diagonally opposite. As a result, the screw bolt 3 can in each case be used only in a certain rotational position inside the opening with the guide webs 7 of the ring body 1 if the guide webs 7 are arranged such that, between them and the short exterior side of the oblong hole 6, in each case only the short curved section of the screw bolt 3 can come to be situated between its guide grooves 9. If, on the head 4 of the bolt 3 constructed as a screw bolt, a marking, which is visible from the outside, is assigned to the short circular arc between the guide grooves 9, it can easily be recognized from the outside in the case of a mounted screw bolt 3, to which side it is displaced within the opening of the ring body 1. In practice, this is necessary for a recognition of the eccentric position from the outside. Such a marking can easily be provided in the form of an arrow provided on the screwhead 4 or in the form of a notch 10.

In the case of the illustrated embodiment, only two guide webs respectively per longitudinal side exist in the oblong hole 6 of the ring body 1, resulting in a total of three installation positions for the screw bolt 3 if, in each case, only the short curved section of the screw bolt 3 can form-lockingly be situated between the guide webs 7 and the short side of the oblong hole 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A position-variable face-side clamping of a ring body, particularly in the case of a bearing for linking a wheel control arm of motor vehicles, between oppositely situated bearing legs by means of a bolt which can be axially inserted into aligned openings in the bearing legs as well as an aligned opening in the ring body and having stops which can be provided on the end sides of the bolt for bracing the legs with respect to the ring body, wherein at least one of said aligned opening in the ring body or said aligned openings in the bearing legs is an oblong hole, each longitudinal side of said oblong hole is provided with at least two axially extending, mutually opposite guide webs which permit a fixing of the bolt in different areas of the oblong hole, wherein further said at least two axially extending, mutually opposite guide webs have distances from one another in the longitudinal direction of said oblong hole and have distances with respect to the transverse sides of said oblong hole, which permit at least one receiving of said bolt with a cylindrically closed exterior shape which is defined with respect to its position and at least two positions deviating therefrom by the insertion of the bolt with guide grooves adapted to the guide webs.

2. The position-variable clamping according to claim 1, wherein only two axially extending, mutually opposite two guide webs are provided on each longitudinal side of said oblong hole.

3. The position-variable clamping according to claim 2, wherein mutually opposite guide webs situated on the outside in the longitudinal direction of said oblong hole have a distance from the respective adjoining transverse side of said oblong hole through which said bolt can be slid into said oblong hole only by means of guide grooves, which guide grooves are arranged to be not diagonally opposite, with smaller circumferential area of said bolt situated between said guide grooves adjoining said transverse side of said oblong hole.

4. The position-variable clamping according to claim 1, wherein mutually opposite guide webs situated on the outside in the longitudinal direction of said oblong hole have a distance from the respective adjoining transverse side of said oblong hole through which said bolt can be slid into said oblong hole only by means of said guide grooves, which guide grooves are arranged to be not diagonally opposite, with smaller circumferential area of said bolt situated between said guide grooves adjoining said transverse side of said oblong hole.

5. The position-variable clamping according to claim 1, wherein said axially extending, mutually opposite guide webs are limited to an axial center area of the ring body.

6. The position-variable clamping according to claim 4, wherein said axially extending, mutually opposite guide webs are limited to an axial center area of the ring body.

7. An assembly, comprising:

a vehicle wheel control arm ring body carried by a vehicle wheel control arm, said ring body being positioned in use with respective ring body end faces clamped between bearing legs having through openings, said ring body having a through opening extending between the end faces, and a clamping bolt extending through the through openings in said bearing legs and said through opening of the ring body and clamping said bearing legs against the ring body end faces, wherein at least one of said through openings in said bearing legs or said through opening in said ring body exhibits an oblong cross-sectional shape with at least two axially extending mutually oppositely located guide webs permitting fixing of said ring body with respect to said clamping bolt at different relative radial positions, thereby facilitating a plurality of installation positions of said ring body and bearing legs.

8. The assembly according to claim 7, wherein said guide webs are configured to facilitate a centric location of a cylindrical bolt and two eccentric locations of a formed bolt with cutouts engageable with said webs.

9. The assembly according to claim 8, wherein said through opening in said ring body exhibits said oblong cross-sectional shape with said webs and wherein further said through openings in said bearing legs are cylindrical in cross-section.

10. The assembly according to claim 8, wherein said through opening in said ring body is cylindrical in cross-section and wherein further said through openings in said bearing legs exhibit said oblong cross-sectional shape with said webs.

11. The assembly according to claim 8, wherein said through opening in said ring body and said through openings in said bearing legs exhibit said oblong cross-sectional shape with said webs.

12. A method of making an assembly for supporting a vehicle wheel control arm with respect to a pair of facing bearing legs, comprising:

providing a vehicle wheel control arm ring body to be carried by the vehicle wheel control arm, said ring body being positioned in use with respective ring body end faces clamped between the bearing legs, said ring body having a through opening extending between the end faces, and providing a clamping bolt extending through through openings in said bearing legs and said through opening of the ring body and clamping said bearing legs against the ring body end faces, wherein at least one of said through openings in said bearing legs or said through opening in said ring body exhibits an oblong cross-sectional shape with at least two axially extending mutually oppositely located guide webs permitting fixing of said ring body with respect to said clamping bolt at different relative radial positions, thereby facilitating a plurality of installation positions of said ring body and bearing legs.

13. The method according to claim 12, wherein said guide webs are configured to facilitate a centric location of a cylindrical bolt and two eccentric locations of a formed bolt with cutouts engageable with said webs.

14. The method according to claim 13, wherein said through opening in said ring body exhibits said oblong cross-sectional shape with said webs and wherein further said through openings in said bearing legs are cylindrical in cross-section.

15. The method according to claim 13, wherein said through opening in said ring body is cylindrical in cross-section and wherein further said through openings in said bearing legs exhibit said oblong cross-sectional shape with said webs.

16. The method according to claim 13, wherein said through opening in said ring body and said through openings in said bearing legs exhibit said oblong cross-sectional shape with said webs.

* * * * *